US011150623B2

(12) United States Patent
Jiang et al.

(10) Patent No.: US 11,150,623 B2
(45) Date of Patent: Oct. 19, 2021

(54) DATA-DRIVEN APPROACH FOR EFFECTIVE SYSTEM CHANGE IDENTIFICATION

(71) Applicant: GM GLOBAL TECHNOLOGY OPERATIONS LLC, Detroit, MI (US)

(72) Inventors: Shengbing Jiang, Rochester Hills, MI (US); Chaitanya Sankavaram, Rochester Hills, MI (US); Yilu Zhang, Northville, MI (US); Paul A. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 16/456,776

(22) Filed: Jun. 28, 2019

(65) Prior Publication Data
US 2020/0409326 A1    Dec. 31, 2020

(51) Int. Cl.
*G05B 19/048*  (2006.01)
*G06N 3/08*  (2006.01)
(Continued)

(52) U.S. Cl.
CPC .......... *G05B 19/048* (2013.01); *G06N 3/08* (2013.01); *G06N 20/00* (2019.01); *G06N 20/10* (2019.01); *B60W 50/00* (2013.01); *B60W 2050/0083* (2013.01); *G05B 2219/24075* (2013.01); *G07C 5/0808* (2013.01)

(58) Field of Classification Search
None
See application file for complete search history.

(56) References Cited

U.S. PATENT DOCUMENTS 7,292,960 B1   11/2007  Srinivasa et al.
7,509,234 B2   3/2009   Unnikrishnan et al.
(Continued)

OTHER PUBLICATIONS

U.S. Appl. No. 16/002,546, filed Jun. 7, 2018, Liu et al.
U.S. Appl. No. 16/212,120, filed Dec. 6, 2018, Jiang et al.

*Primary Examiner* — Mohammad Ali
*Assistant Examiner* — Saad M Kabir
(74) *Attorney, Agent, or Firm* — Harness, Dickey & Pierce, P.L.C.

(57) ABSTRACT

A control system for identifying and responding to effective system changes in a monitored system includes data collection, change identification, classifier construction, effective system change and parameter adjustment modules. The data collection module tracks parameters of the monitored system. The change identification module, based on the parameters, identifies: during training, performance changes and first system changes; and post training, a set of performance changes and second system changes. The classifier construction module, based on the performance changes and the first system changes construct a performance-system change classifier module. The performance-system change classifier module, based on the set of performance changes, determines possible system changes and respective probability values. The effective system change module, based on the second and possible system changes, determines effective system changes and respective probability values. The parameter adjustment module controls an actuator of the monitored system based on the effective system changes and the probability values.

20 Claims, 9 Drawing Sheets

(51) Int. Cl.
*G06N 20/10* (2019.01)
*G06N 20/00* (2019.01)
*B60W 50/00* (2006.01)
*G07C 5/08* (2006.01)

(56) References Cited

U.S. PATENT DOCUMENTS

| | | |
|---|---|---|
| 7,526,461 B2 | 4/2009 | Srinivasa et al. |
| 7,644,078 B2 | 1/2010 | Sastry et al. |
| 7,644,079 B2 | 1/2010 | Sastry et al. |
| 7,899,761 B2 | 3/2011 | Kadambe et al. |
| 8,032,333 B2 | 10/2011 | Holland |
| 8,301,333 B2 | 10/2012 | Singh et al. |
| 8,498,776 B2 | 7/2013 | Singh et al. |
| 8,509,985 B2 | 8/2013 | Subramania et al. |
| 8,676,432 B2 | 3/2014 | Patnaik et al. |
| 2009/0295559 A1 | 12/2009 | Howell et al. |
| 2010/0030418 A1 | 2/2010 | Holland |
| 2010/0057479 A1 | 3/2010 | De et al. |
| 2019/0041845 A1* | 2/2019 | Cella ................... G01M 13/028 |
| 2019/0171897 A1* | 6/2019 | Merai .................. G06K 9/6267 |

\* cited by examiner

DATA-DRIVEN APPROACH FOR EFFECTIVE SYSTEM CHANGE IDENTIFICATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to monitoring and evaluating performance changes of a system.

A vehicle typically includes various systems, such as a propulsion system, a communication system, an infotainment system, an air conditioning system, and a lighting system. Control modules may be implemented to monitor, evaluate and respond to states of the systems of the vehicle. Various parameters of the systems may be monitored and operations may be performed based on changes in the parameters. As an example, temperature within a vehicle may be detected and when the temperature is outside a predetermined range of a set temperature, the air-conditioning system responds by increasing an amount of heating or cooling provided to adjust the temperature within the vehicle. As another example, a speed of the vehicle may be monitored and when the speed of the vehicle is outside a predetermined range of a set speed, the propulsion system may adjust air, fuel, spark and/or power output to adjust the speed of the vehicle.

SUMMARY

A control system for identifying and responding to effective system changes in a monitored system is provided and includes a data collection module, a change identification module, a classifier construction module, an effective system change module and a parameter adjustment module. The data collection module is configured to track parameters of the monitored system. The change identification module is configured to, based on the parameters, identify (i) during training, performance changes and first system changes, and (ii) post training, a set of performance changes and second system changes. The classifier construction module is configured to, based on the performance changes and the first system changes construct a performance-system change classifier module. The performance-system change classifier module is configured to, based on the set of performance changes, determine possible system changes and respective probability values. The effective system change module is configured to, based on the second system changes and the possible system changes, determine one or more effective system changes and a respective one or more probability values. The parameter adjustment module is configured to control an actuator of the monitored system based on the one or more effective system changes and the respective one or more probability values.

In other features, the data collection module is configured to determine which system related parameters and which performance related parameters to monitor that are relevant for identifying system changes and performance changes in operation of the monitored system.

In other features, the performance-system change classifier module is configured to identify associations between the set of performance changes and the possible system changes using data analytics and signal processing.

In other features, the classifier construction module is configured to: represent system change and performance change relationships as a cause-effect model; and based on the cause-effect model, construct the performance-system change classifier module using at least one of artificial intelligence or machine learning.

In other features, the performance-system change classifier module implements at least one of a neural network, a support vector machine, or a random forest algorithm to determine the possible system changes based on the set of performance changes.

In other features, the performance-system change classifier module is configured to determine the possible system changes and respective probabilities based on an individualized classifier model and an aggregated classifier model.

In other features, the change identification module is configured to: discretize data collected for at least one of the parameters including comparing the data to predetermined ranges and converting each data point to one of a predetermined set of finite values; and detect the set of performance changes based on changes in values of the converted data.

In other features, the classifier construction module is configured to: arrange the first system changes and the performance changes according to respective times of occurrence; re-organize the arranged first system changes and performance changes into multiple tuples; and construct the performance-system change classifier module based on the tuples.

In other features, the effective system change module is configured to: determine which ones of the possible system changes are not included in the second system changes and set the corresponding probabilities to 0%; and normalize at least probabilities of remaining ones of the possible system changes having probabilities greater than 0% to determine the one or more effective system changes and a corresponding probability distribution.

In other features, the control system further includes the actuator. The actuator is implemented in a vehicle. The parameter adjustment module is configured to: based on the one or more effective system changes and the respective one or more probability values, at least one of adjust a calibration setting or evaluate a diagnostic fault of the monitored system; and based on the adjusted calibration setting or a result of the evaluation of the diagnostic fault, adjust operation of the actuator.

In other features, a method of identifying and responding to effective system changes in a monitored system is provided. The method includes: tracking multiple parameters of the monitored system; based on the parameters, identifying (i) during training, performance changes and first system changes, and (ii) post training, a set of performance changes and second system changes; based on the performance changes and the first system changes constructing a performance-system change classifier module, wherein the performance-system change classifier module is configured to, based on the set of performance changes, determine possible system changes and respective probability values; based on the second system changes and the possible system changes, determining one or more effective system changes and a respective one or more probability values; and based on the one or more effective system changes and the respective one or more probability values, controlling an actuator of the monitored system based on the one or more effective system changes and the respective one or more probability values.

In other features, the method further includes determining which system related parameters and which performance related parameters to monitor that are relevant for identifying system changes and performance changes in operation of the monitored system.

In other features, the method further includes identifying associations between the set of performance changes and the possible system changes using data analytics and signal processing.

In other features, the method further includes: representing system change and performance change relationships as a cause-effect model; and based on the cause-effect model, constructing the performance-system change classifier module using at least one of artificial intelligence or machine learning.

In other features, the method further includes implementing at least one of a neural network, a support vector machine, or a random forest algorithm to determine the possible system changes based on the set of performance changes.

In other features, the method further includes determining the possible system changes and respective probabilities based on an individualized classifier model and an aggregated classifier model.

In other features, the method further includes: discretizing data collected for at least one of the parameters including comparing the data to predetermined ranges and converting each data point to one of a predetermined set of finite values; and detecting the set of performance changes based on changes in values of the converted data.

In other features, the method further includes: arranging the first system changes and the performance changes according to respective times of occurrence; re-organizing the arranged first system changes and performance changes into multiple tuples; and constructing the performance-system change classifier module based on the tuples.

In other features, the method further includes: determining which ones of the possible system changes are not included in the second system changes and set the corresponding probabilities to 0%; and normalizing at least probabilities of remaining ones of the possible system changes having probabilities greater than 0% to determine the one or more effective system changes and a corresponding probability distribution.

In other features, the method further includes: based on the one or more effective system changes and the respective one or more probability values, at least one of adjusting a calibration setting or evaluating a diagnostic fault of the monitored system; and based on the adjusted calibration setting or a result of the evaluating of the diagnostic fault, adjusting operation of the actuator, wherein the actuator is implemented in a vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
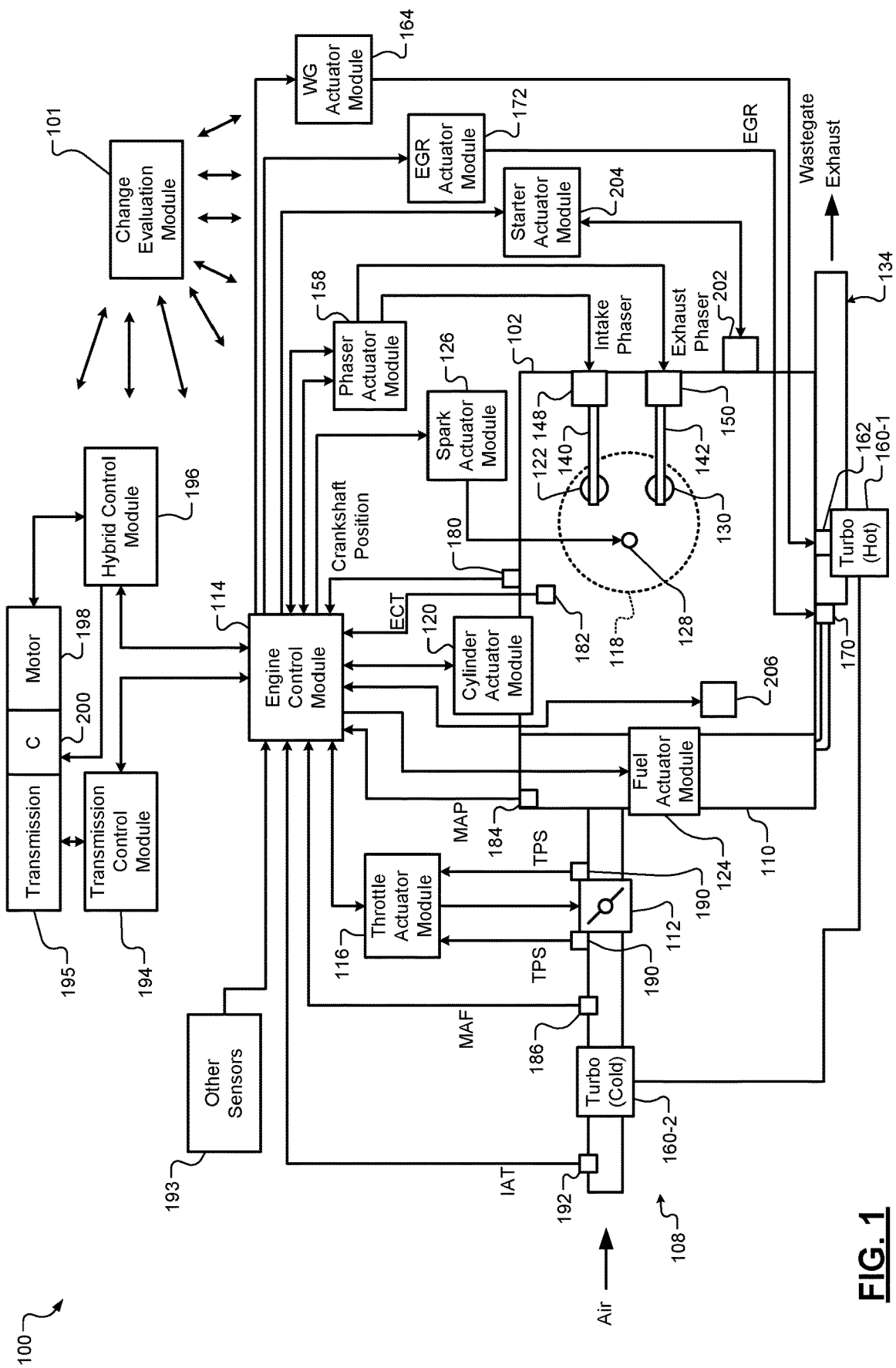
FIG. 1 is a functional block diagram of an example vehicle control system including a change evaluation module in accordance with an embodiment of the present disclosure.

System changes of parameters of a system result in performance changes. System changes may be a result of user inputs, local or remote control commands, and/or other change initiators that cause a direct change in a parameter. As an example, in a vehicle a user may provide user inputs by changing an accelerator pedal position, a brake pedal position, a steering wheel angle, an air-conditioning system setting, a lighting setting, an infotainment system setting, etc. The provided user inputs change corresponding parameters, such as pedal position, steering wheel angular position, active/deactive settings, etc. The user inputs directly cause system changes by changing the corresponding parameters and indirectly causing performance changes. As an example, changes in the pedal positions results in changes in an amount of acceleration or deceleration and a speed of the vehicle. Each performance change of a system may be a result of one or more system changes.

In many applications, in order to have an understanding of the causes of performance changes, such as what caused a decrease in performance (e.g., a decrease in fuel efficiency), it is necessary to determine what system changes caused the performance changes. System changes that cause performance changes are referred to as effective system changes. Multiple system changes can affect one or more performance changes. It can be difficult to determine the actual one or more system changes that caused a performance change. For example, multiple different calibration settings can affect multiple different operating aspects of a system, which can all affect a single performance parameter. Also, multiple system changes may occur during a same period of time and it can be difficult to determine which one or more of the system changes affect a particular performance change.

Effective system changes can be system application dependent and may be determined based on domain knowledge. As used herein the term "system application" refers to a system and corresponding conditions and environment in which the system is operating. For example, a system application may refer to a vehicle operating in a hot mountainous climate pulling a heavy load with little-to-no nearby traffic. Domain knowledge refers to predetermined relationships between system changes and performance changes. A classifier that is able to determine effective system changes based on domain knowledge and is system application dependent can be complex due to the difficulty in determining the effective system changes and thus can be costly.

The examples set forth herein provide a data driven approach to identify effective system changes in a monitored system. The data driven approach determines which ones of multiple system changes that occurred in a given period of time caused current (or monitored) performance changes. The examples include identifying system changes and performance changes based on collected system data, operation data, and performance data. Individualized and aggregated system change classification of whether a system change is an effective system change or a non-effective system change are performed. Each system change in a set of occurred system changes may be determined as being an effective system change or a non-effective system change. This allows for the classification to be directed more to a particular system application (or individualized) while providing classification to be performed for environments and/or operating conditions in which a corresponding system does not typically operate.

Although the examples set forth herein are primarily described with respect to vehicle implementations, the examples are applicable to non-vehicle implementations.

FIG. 1 shows an example powertrain system 100 of a vehicle including a change evaluation module 101 for monitoring system changes and performance changes and determining which of the system changes are effective system changes relative to one or more of the performance changes. The powertrain system 100 may include an engine 102, as shown, that combusts an air/fuel mixture to produce torque. The vehicle may be non-autonomous, partially autonomous or fully autonomous.

Air is drawn into the engine 102 through an intake system 108. The intake system 108 may include an intake manifold 110 and a throttle valve 112. For example only, the throttle valve 112 may include a butterfly valve having a rotatable blade. An engine (or vehicle) control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 may include any number of cylinders, for illustration purposes a single representative cylinder 118 is shown. The ECM 114 may instruct a cylinder actuator module 120 to selectively deactivate some of the cylinders under some circumstances, which may improve fuel efficiency. The engine 102 may operate using a four-stroke cycle or another suitable engine cycle.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The engine 102 may be a homogenous charge compression ignition (HCCI) engine that performs both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During a combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC). During an exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from a power source (e.g., a battery pack, which is not shown) to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and may store the DC power in the power source. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
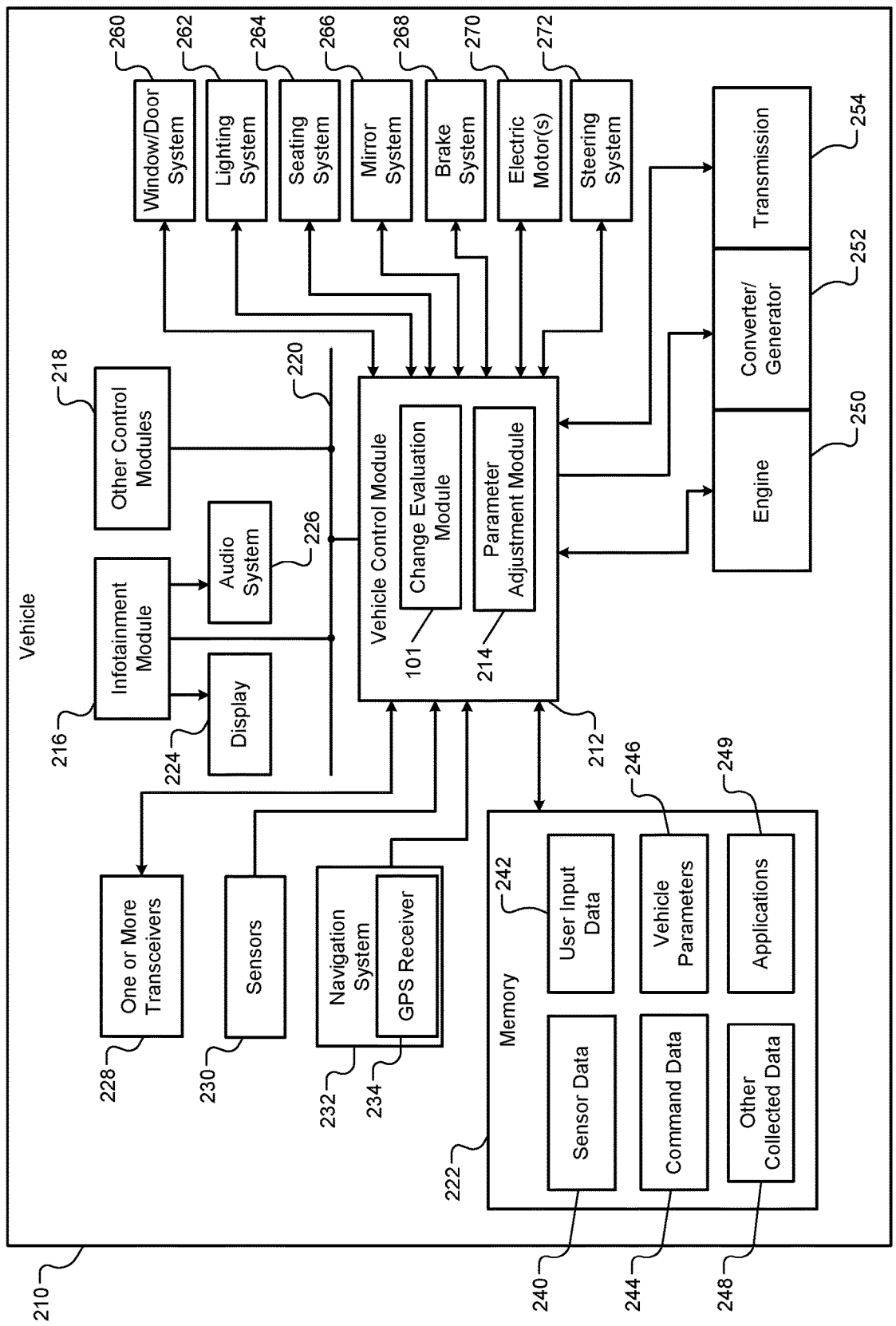
FIG. 2 is a functional block diagram of an example vehicle including the change evaluation module in accordance with an embodiment of the present disclosure.

FIG. 2 shows a vehicle 210, which may include the powertrain system 100 of FIG. 1. The vehicle 210 may include a vehicle control module 212, which may include the change evaluation module 101 and a parameter adjustment module 214. The vehicle 210 may further include an infotainment module 216 and other control modules 218. The modules 101, 212, 214, 216, 218 may communicate with each other via a controller area network (CAN) bus 220 and/or other suitable interfaces. The vehicle control module 212 may control operation of vehicles systems. The change evaluation module 101 is further described below. The parameter adjustment module 214 may be used to adjust parameters of the vehicle 210.

The vehicle 210 may further include: a memory 222; a display 224; an audio system 226; one or more transceivers (or telematics module) 228, sensors 230; and a navigation system 232 including a global positioning system (GPS) receiver 234. The sensors 230 may include sensors, cameras, objection detection sensors, temperature sensors, accelerometers, vehicle velocity sensor, and/or other sensors. The GPS receiver 234 may provide vehicle velocity and/or direction (or heading) of the vehicle and/or global clock timing information.

The memory 222 may store sensor data 240, user input data, 242, command data 244, vehicle parameters 246, and/or other collected data 248. The memory may also store applications 249. In an embodiment, the applications are 249 executed to implement the modules 101 and 214. Although the memory 222 and the vehicle control module 212 are shown as separate devices, the memory 222 and the vehicle control module 212 may be implemented as a single device.

The vehicle control module 212 may control operation of an engine 250, a converter/generator 252, a transmission 254, a window/door system 260, a lighting system 262, a seating system 264, a mirror system 266, a brake system 268, electric motors 270 and/or a steering system 272 according to parameters set by the modules 101, 212, 214. Some of the vehicle control operations may include unlocking doors of the window/door system 260, enabling fuel and spark of the engine 250, starting the electric motors 270, powering any of the systems 260, 262, 264, 266, 268, 270, 272 and/or performing other operations as are further described herein.

The engine 250, the converter/generator 252, the transmission 254, the window/door system 260, the lighting system 262, the seating system 264, the mirror system 266, the brake system 268, the electric motors 270 and/or the steering system 272 may include actuators controlled by the parameter adjustment module 214 and/or the vehicle control module 212 to, for example, adjust fuel, spark, air flow, steering wheel angle, throttle position, pedal position, door locks, window position, seat angles, etc. This control may be based on the outputs of the sensors 230, the navigation system 232, the GPS receiver 234 and the above-stated data and information stored in the memory 222.

The parameter adjustment module 214 may determine various parameters including a vehicle speed, an engine speed, an engine torque, a gear state, an accelerometer position, a brake pedal position, an amount of regenerative (charge) power, an amount of boost (discharge) power, an amount of autostart/stop discharge power, and/or other information, etc. The parameter adjustment module 214 may share this information with the change evaluation module 101.

Figure 3:
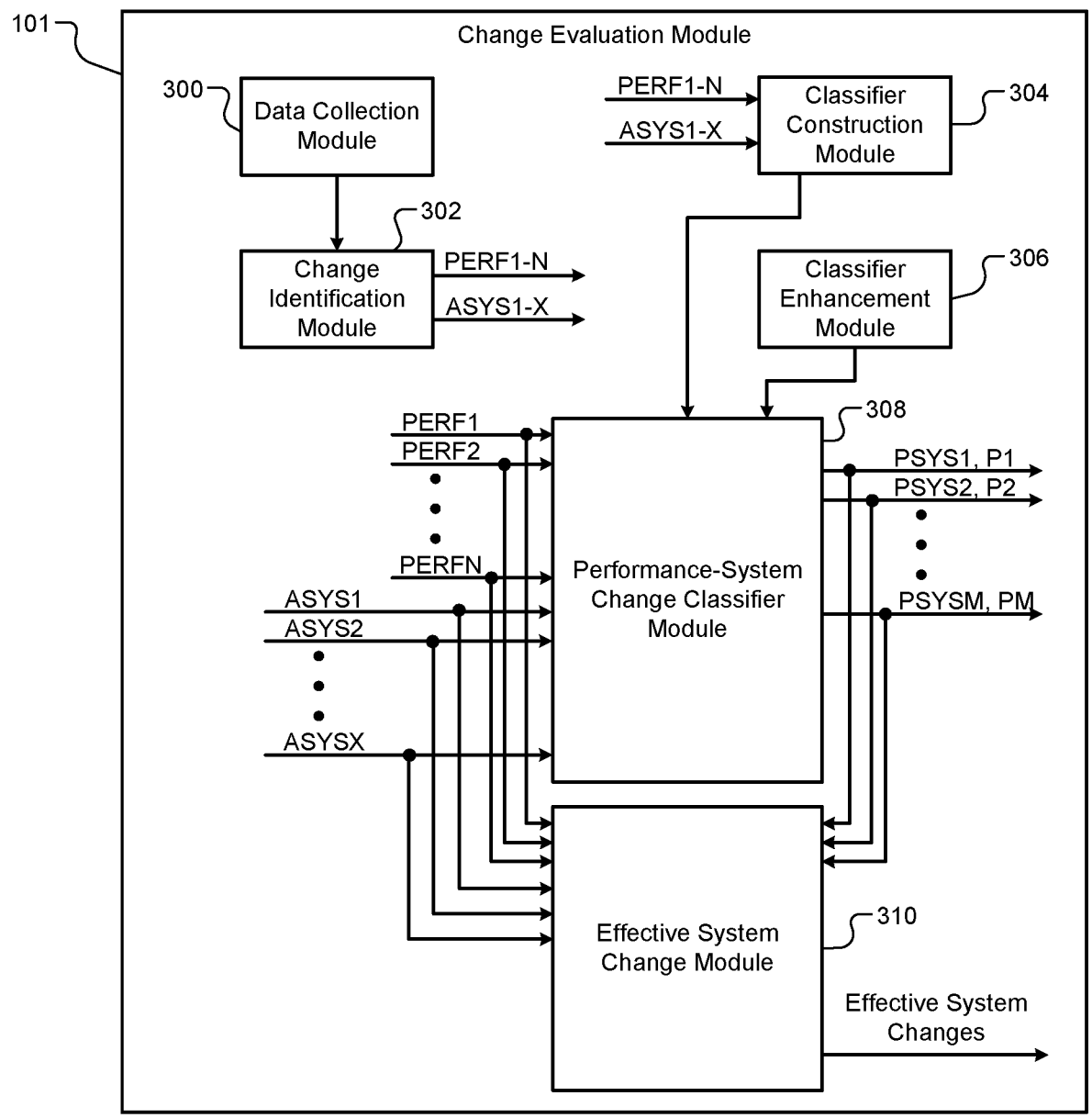
FIG. 3 is a functional block diagram of the change evaluation module in accordance with an embodiment of the present disclosure.

FIG. 3 shows the change evaluation module 101, which may include a data collection module 300, a change identification module 302, a classifier construction module 304, a classifier enhancement module 306, a performance-system change classifier module 308 and an effective system change module 310. The data collection module collects data, such as user inputs, control inputs, control commands, sensor data and/or other data related to monitored parameters. The change identification module 302 identifies system changes and performance changes to monitor. The change identification module 302 monitors system operation data, identifies system and performance changes using signal processing and change detection techniques, and timestamps each change indicating when the changes occurred. The changes may include actual system changes ASYS1-X and performance changes PERF1-N.

The identified changes are based on discretized values for continuous parameters, where the discretization may be based on discrete ranges and/or unsupervised machine learning. As an example, a change may have occurred in temperature, which can be a continuously changing parameter. A detected temperature signal may be discretized into discrete values by comparing temperatures at certain times to predetermined temperature ranges, determining which range the detected temperatures are in, and providing values of the ranges as the discretized values. Each of the predetermined ranges may have a respective identifier value. For example possible temperature values may be divided into High (e.g., temperatures greater than 80° F.), Medium (e.g., temperatures between 50-80° F.) and Low (e.g., temperatures less than 50° F.) ranges having respective 1, 2, 3 values.

Figure 4:
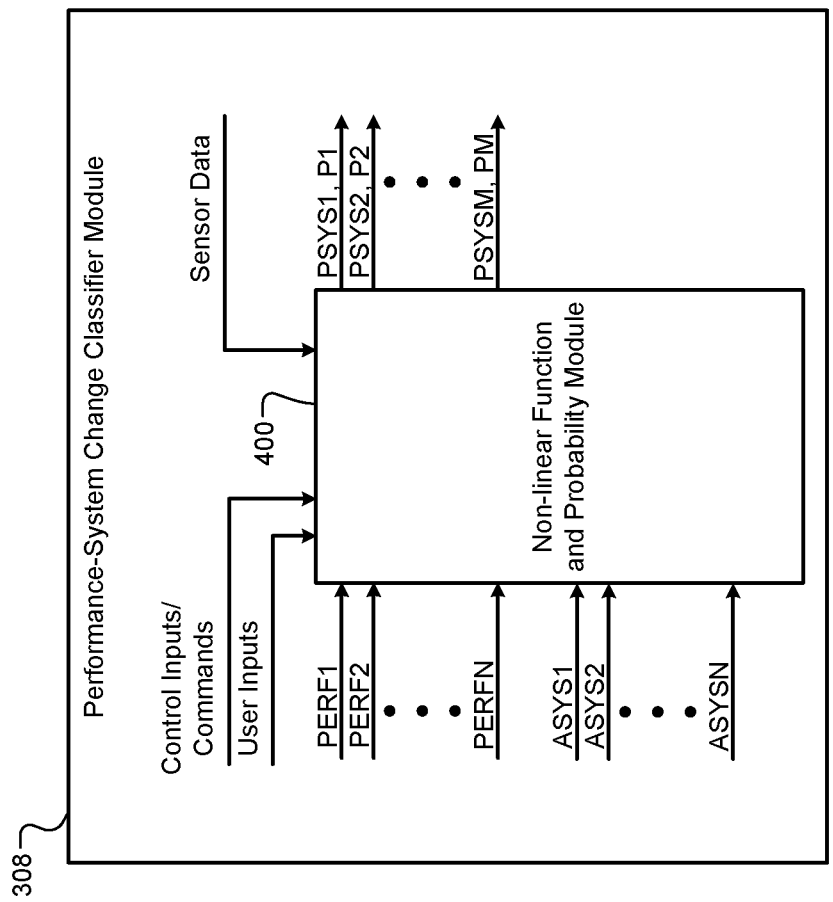
FIG. 4 is a functional block diagram of an example performance-system change classifier module in accordance with an embodiment of the present disclosure.

The classifier construction module 304 constructs the performance-system change classifier module 308 and/or a non-linear function and probability module 400 shown in FIG. 4. The classifier enhancement module 306 enhances individualized classifiers with aggregated classifiers. In an embodiment, the non-linear function and probability module 400 is implemented as multiple classifiers that include one or more individualized classifiers (or classifier modules) and one or more aggregated classifiers (or classifier modules). The individualized classifiers are more system application specific, whereas the aggregated classifiers are more applicable to multiple system applications. The non-linear function and probability module 400 receives the identified performance changes PERF1-N, the actual identified system changes ASYS1-X, and determines possible corresponding system changes PSYS1-M and respective probability values P1-M. Inclusion of aggregated classifiers allows for example change classifiers of vehicles, which travel outside local areas (or into areas not typically driven in) to be able to determine system changes based on identified performance changes. In one embodiment, a vehicle includes a single performance-system change classifier module that is implemented as an aggregated classifier functioning based on collected aggregate data associated with various geographical regions, conditions and environments.

The non-linear function and probability module 400 may use artificial intelligence and/or machine learning while being trained. As a few examples, the non-linear function and probability module may implement a neural network, a support vector machine, a random forest algorithm, and/or one or more other non-linear function based algorithms, which may be trained, configured and/or setup during a learning mode, referred to as constructing the performance-system change classifier module 308 and/or non-linear function and probability module 400.

Some examples of system changes are: documented system changes, repairs performed; hardware and software changes; supplier changes; calibration changes; operating changes; changes occurring during manufacturing in different plant conditions and at different times; different diagnostic trouble codes (DTCs); different driver-operating conditions; and/or other system changes of interest. Some examples of performance changes are: a DTC set; system behavior (e.g., functional behaviors, noise vibration and harshness (NVH) behaviors, etc.); measurable system outputs; and/or other system performance metrics or outputs of interest. Performance changes may be recorded before and/or after occurrence of system changes. In an embodiment, the performance changes are recorded continuously for extended periods of time. Multiple different performance changes may be recorded for different system components during a same period of time.

The effective system change module 310 identifies the effective system changes and corresponding probability distribution for a given set of performance changes. In one embodiment, the modules 308, 310 are implemented as a single module.

Operations of the modules 300, 302, 304, 306, 308 and 310 are further described below with respect to the methods of FIGS. 5-8.

Figure 5:
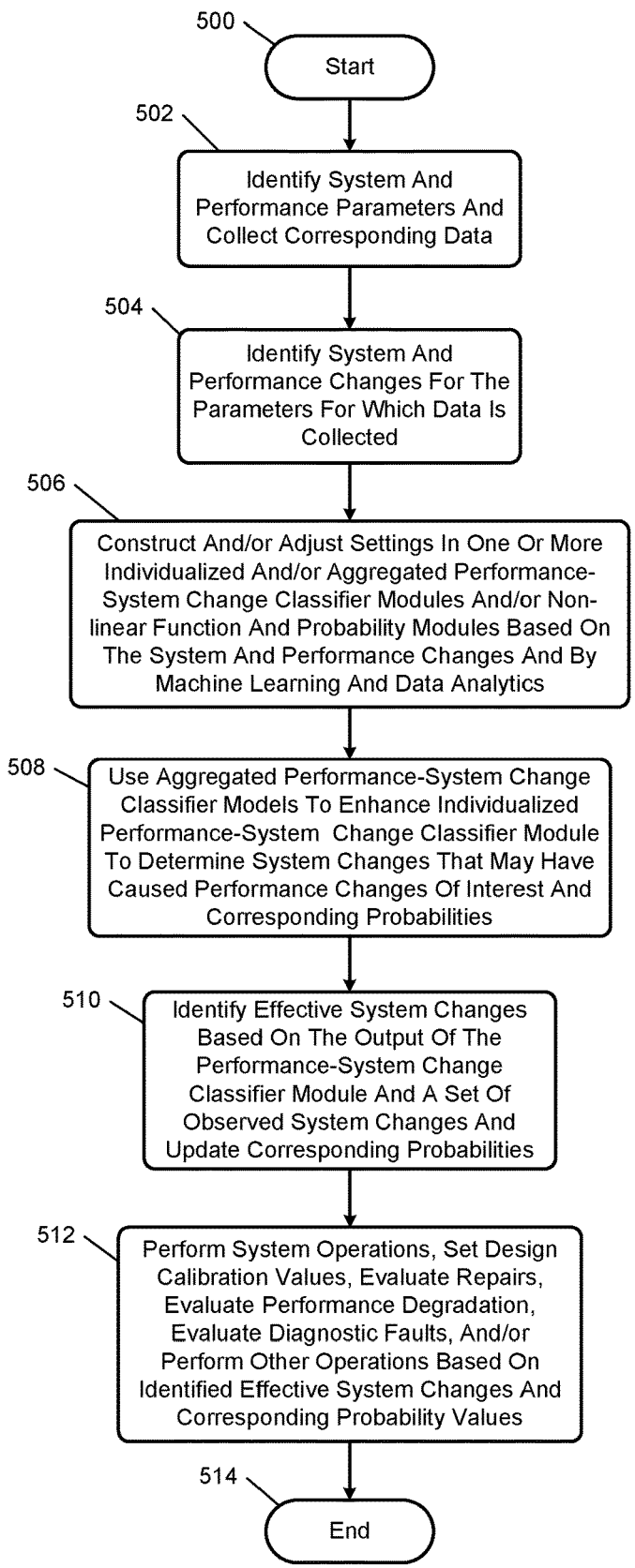
FIG. 5 illustrates an example method of determining effective system changes that caused performance changes in accordance with an embodiment of the present disclosure.

The systems disclosed herein may be operated using numerous methods, example methods are illustrated in FIGS. 5-8. In FIG. 5, a method of determining effective system changes that caused performance changes is shown. Although the following methods are shown as separate methods, the methods and/or operations from separate methods may be combined and performed as a single method. For example, operation 504 of FIG. 5 may be implemented as the method of FIG. 6. Operation 506 of FIG. 5 may be implemented as the method of FIG. 7. Operation 510 of FIG. 5 may be implemented as the method of FIG. 8.

Although the following operations of FIGS. 5-8 are primarily described with respect to the implementations of FIGS. 1-8, the operations may be easily modified to apply to other implementations of the present disclosure. The operations may be iteratively performed.

The method of FIG. 5 may begin at 500. At 502, the data collection module 300 identifies system and performance parameters to track and collects corresponding data. Depending on a type of system being monitored, the data collection module 300 may identify related system and performance parameters using expert system knowledge and/or signal processing and change detection techniques. This includes recording parameter values in a memory for system operations. The expert system knowledge may refer to predetermined parameters to be monitored for the particular type of system. The types of systems may refer to powertrain, electrical, lighting, entertainment, braking, diagnostic, communication, air-conditioning, and/or other types of vehicle systems. The types of systems may refer to non-vehicle types of systems and/or systems that are not internal to a vehicle, such as a manufacturing, diagnostic and/or product tracking system. At 504, the change identification module 302 identifies system and performance changes of the parameters for which data was collected at 502.

At 506, the classifier construction module 304 may construct the performance-system change classifier module 308 and/or the non-linear function and probability module 400. The modules 308, 400 may be constructed during a learning mode or may be modified, updated and/or used during a normal operating mode. The classifier construction module 304 may represent system change and performance change relationships as a cause-effect model and construct the performance-system change classifier module 308 using at least one of artificial intelligence or machine learning. The performance-system change classifier module 308 may be constructed based on the cause-effect model.

At 508, the non-linear function and probability module 400 determines system changes that may have caused the performance changes and corresponding probabilities. Each of the probabilities indicates a likelihood that the corresponding one of the system changes caused one of the performance changes. A set of one or more system changes may have caused a set of one or more performance changes. The classifier enhancement module 306 may aid in determining the system changes that may have caused the performance changes as described above using aggregated performance-system change classifier models. An aggregated performance-system change classifier model created based on operation data collected by a group and/or fleet of systems and/or vehicles may be used. The aggregated performance-system change classifier model may be used to enhance an individualized performance-system change classifier model for infrequent scenarios that do not typical occur for the system and/or vehicle associated with the individualized performance-system change classifier model.

The classifier enhancement module 306 may: categorize the aggregated model into different models based on system operation profiles (e.g., for vehicles with towing, vehicles with one or multiple people, etc.); individualize multiple aggregated performance-system change classifier models based on individual system and/or vehicle operation; and/or apply multiple individualized performance-system change classifier models to an individual system and/or vehicle for different operation profiles.

At 510, the effective system change module 310 identifies effective system changes based on the output of the performance-system change classifier module 308 and a set of observed system changes. Each of the effective system changes may be determined based on one or more of the possible system changes PSYS1-M and one or more of the actual system changes ASYS1-X. The effective system change module 310 also updates the corresponding probabilities for the effective system changes, as described below with respect to the method of FIG. 8.

The effective system change module 310 identifies effect system changes from a present set of system changes and outputs of the performance-system change classifier module 308. Given real-time operation data and input performance changes observed by the performance-system change classifier module 308, the effective system change module 310 evaluates the effective system changes. If a system change is not present in real-time operation data, then the probability of the system change as an effective system change is 0%, otherwise the probability is a normalized value. The normalized value is a performance-system change classifier output restricted on system changes present in real-time operation data.

At 512, the vehicle control module 212, the parameter adjustment module 214 or other system control module may perform various operations based on the identified effective system changes and corresponding probability values. The module may set design calibration values and/or other calibration values, evaluate repairs previously performed, evaluate performance degradation, evaluate diagnostic faults, etc. By changing calibration values, operations of the corresponding operating system and/or vehicle changes. The calibration values may be associated with, for example: operations of various actuators of a vehicle; settings for adjusting amounts of air and/or fuel to an engine, amounts of voltage and/or current to a motor, ignition timing, and/or flow rates of a heating, ventilation, and air-conditioning (HVAC); lighting settings, sensor settings, actuator response settings, etc. In one embodiment, the effective system changes and corresponding probability values are uploaded to a remote server, which then determines the stated calibration values and/or performs the stated evaluations. The remotely determined calibration values and/or evaluation results may then be downloaded to the control module to, for example, make system updates. The method may end at 514 or return to operation 502.

Figure 6:
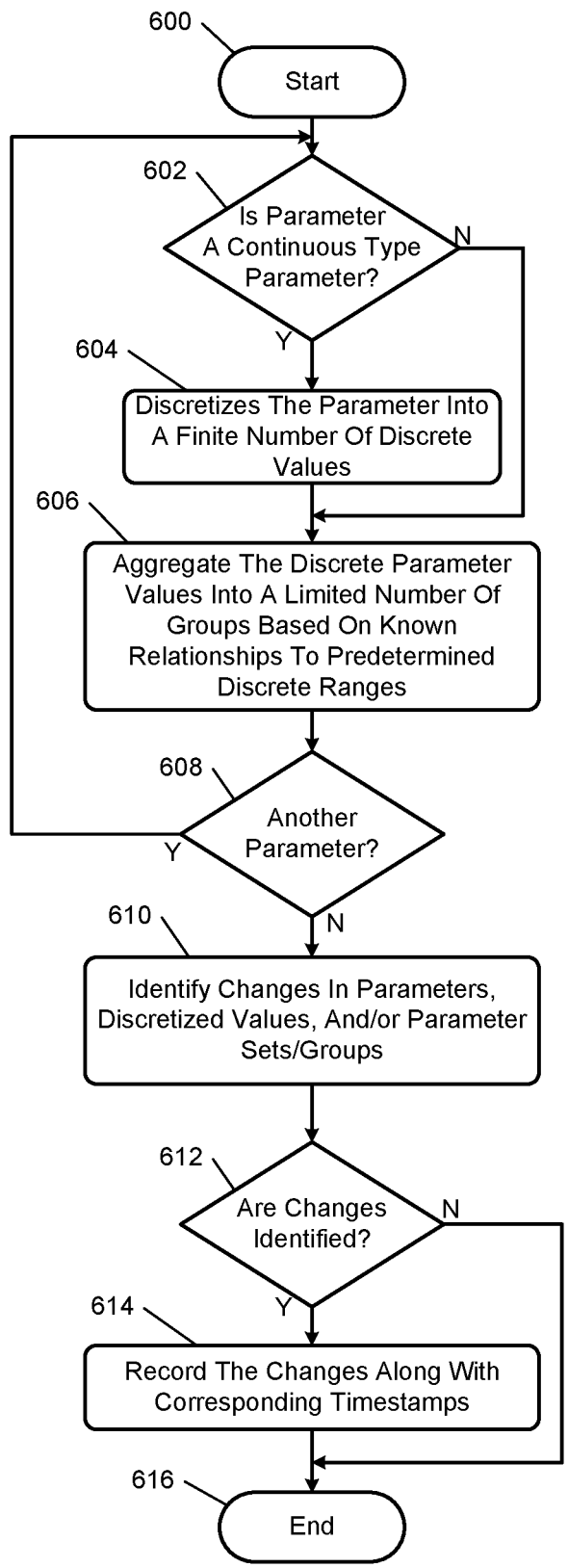
FIG. 6 illustrates an example system and performance change identification method in accordance with an embodiment of the present disclosure.

FIG. 6 shows a system and performance change identification method. The method may begin at 600. At 602, the change identification module 302, for a parameter of interest, determines whether the parameter is a continuous type parameter (e.g., temperature, speed, pressure, flow rate, voltage, current level, power level, etc.). If the parameter is a parameter that continuously changes, the operation 604 is performed, otherwise operation 606 is performed.

At 604, the change identification module 302 discretizes the parameter (or corresponding parameter signal) into a finite number of discrete values. This may include, for each instance in time that a value is recorded, determining whether the value is within one of multiple predetermined ranges. Each of the ranges has a respective identifier value. The identifier value of the range that the parameter is in is later used to detect system and performance changes. For example, when a parameter changes enough such that the identifier value changes from a first range to a second range, then a change is detected. This is different than simply detecting a change in a value of the parameter. The discretization may be used to define the change that occurred, minimize an amount of change data being tracked, and provide a more robust solution.

At 606, the change identification module 302 aggregated the discrete parameter values into a limited number of groups based on known relationships relative to the discrete ranges. This allows for changes between the groups to be detected and monitored.

At 608, the change identification module 302 determines whether there is another parameter of interest. Operations 602-608 while being performed for one parameter may also be performed for one or more other parameters. If there is another parameter of interest, operation 602 may be performed, otherwise operation 610 may be performed.

At 610, the change identification module 302 identifies changes in parameters, discretized values, and/or parameters sets (or groups). The changes may be system changes and/or performance changes. This may include using thresholds, signal processing and/or other change detection techniques. As an example, when a parameter and/or a discretized value exceeds a threshold, then a change is detected. As another example, when a parameter group changes from a first group (associated with a first range of values) to a second group (associated with a second range of values), then a change is detected.

At 612, the change identification module 302 determines whether changes were identified at 610. If changes were identified, operation 614 is performed, otherwise the method may end at 616. At 614, the change identification module 302 records the changes in memory along with corresponding timestamps of the changes.

Figure 7:
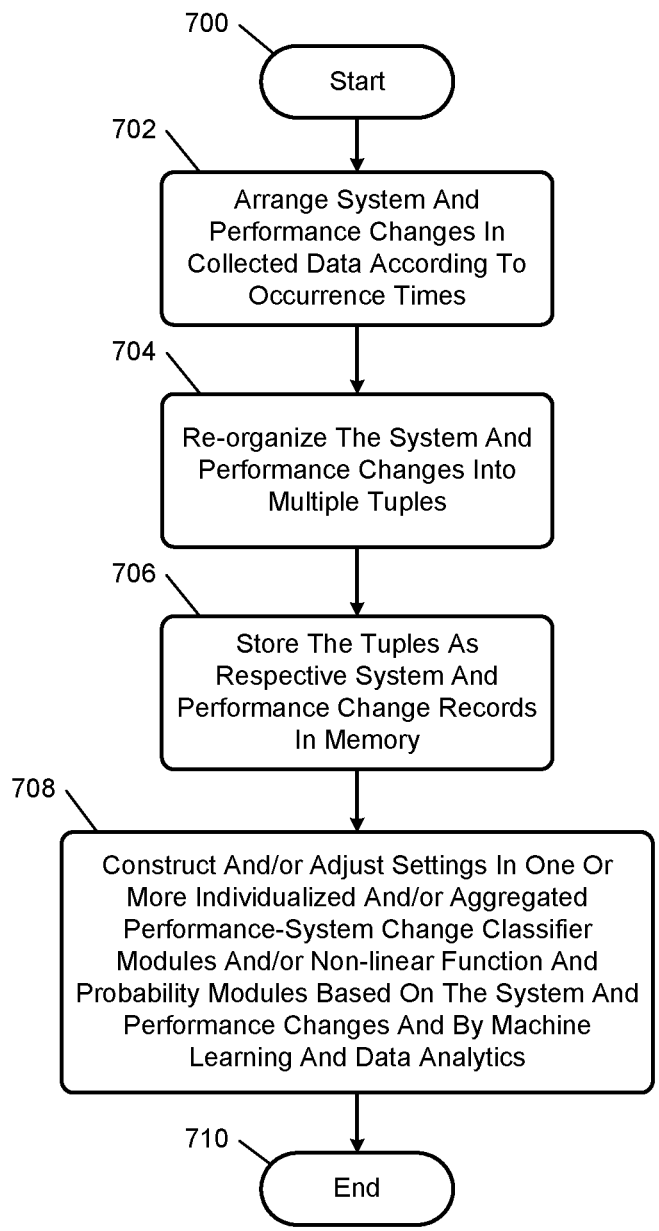
FIG. 7 illustrates an example method of constructing and/or adjusting settings of performance-system change classifier module and/or a non-linear function and probability module in accordance with an embodiment of the present disclosure.

FIG. 7 shows a method of constructing and/or adjusting settings of performance-system change classifier module and/or a non-linear function and probability module. The method may begin at 700. At 702, the classifier construction module 304 arranges the system and performance changes in collected data according to occurrence times, which is based on the timestamps recorded. For example, system changes 1, 2, 3 and performance changes A, B may have occurred at respective times. During construction, the classifier construction module 304 may convert system operation data into an ordered sequence of system changes and performance changes. The classifier construction module 304 may order the changes 1, 2, 3, A, B in the order of occurrence, for example, (system change 1, system change 2, performance change A, system change 3, performance change B).

At 704, the classifier construction module 304 re-organizes the system and performance changes into multiple tuples. Continuing from the above example, a first tuple may be (system change 1, system change 2, performance change A) and a second tuple may be (system change 1, system change 2, system change 3, performance change B). A cause-effect relationship does not identify relevant contributing factors, for example, which of the changes are effective in impacting system performance or vice-versa. At 706, the classifier construction module 304 store the tuples as respective system and performance change records in memory.

At 708, the classifier construction module 304, during the learning mode, constructs one or more individualized and/or aggregated performance-system change classifier modules and/or non-linear function and probability modules based on the system and performance changes. Data analytics may be applied, such as machine learning or statistical inference to derive one or more of the modules 308, 400. Although a single performance-system change classifier module 308 and a single non-linear function and probability module 400 are primary described, more than one of each may be constructed and utilized and/or may each include one or more classifier modules. In an embodiment, the stated construction is accomplished by machine learning and data analytics. During the normal operating mode, the classifier construction module 304 may adjust settings in the created one or more individualized and/or aggregated performance-system change classifier modules and/or non-linear function and probability modules based on the system and performance changes. In one embodiment, settings are not updated during the normal operating mode. The method may end at 710.

Figure 8:
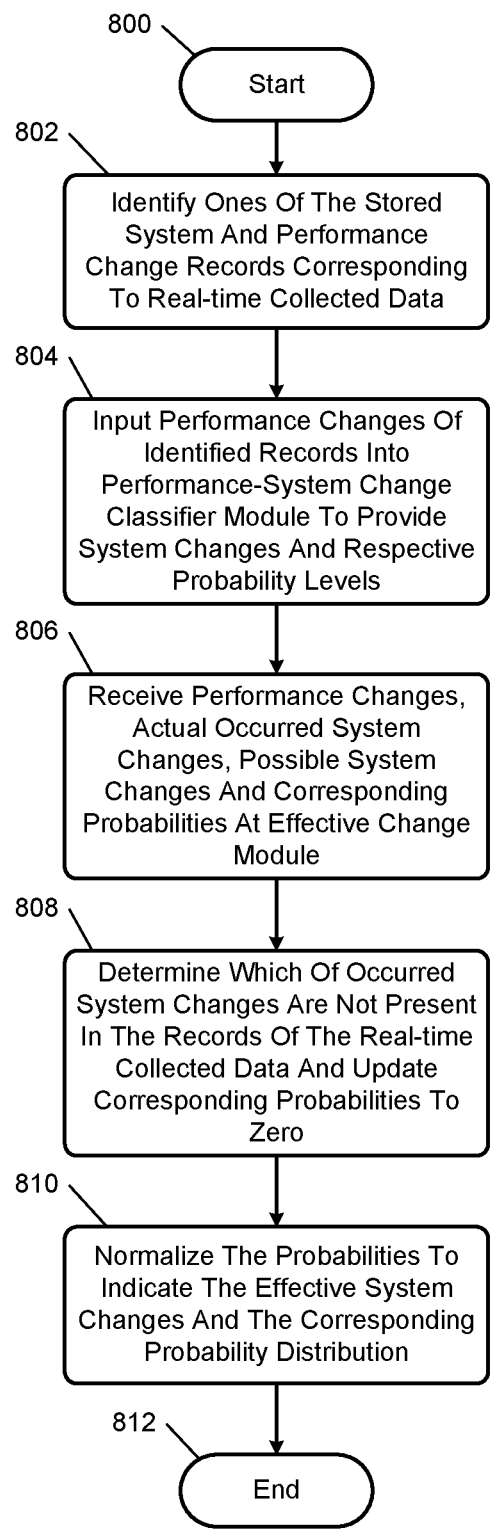
FIG. 8 illustrates an example effective system change identification method in accordance with an embodiment of the present disclosure.

FIG. 8 shows an effective system change identification method. The method may begin at 800. At 802, the change identification module 302 identifies ones of the stored system and performance change records corresponding to real-time collected data, such as the data collected during operation 502 and/or other current system and performance change data. The current system change data may include detected actual occurred system changes corresponding to the detected performance changes. Continuing from the example above, an example record may be (system change 1, system change 3, performance change A, performance change B).

At 804 and in one embodiment, the performance-system change classifier module 308 provides possible system changes and respective probability levels based on the detected performance changes and stated records. This may be based on the structure (e.g., neural network, support vector machine, etc.) and/or algorithm of the non-linear function and probability module 400. For example, performance changes A and B may be provided as inputs and an output may include (system change 1, 60%; system change 2, 40%; system change 3, 0%; . . . , system change M, 0%). In one embodiment, the performance-system change classifier module 308 provides possible system changes based on the records and other more currently collected performance change data.

At 806, the effective system change module 310 receives the identified performance changes and the actual system changes from the change identification module 302 and the possible system changes and probabilities from the performance-system change classifier module 308. The effective system change module 310 also receives the actual system changes.

At 808, the effective system change module 310 determines which of the occurred system changes are not present in the records of the real-time collected data and updates corresponding probabilities to zero. In one embodiment, the effective system change module 310 determines which of the actual occurred system changes are not identified as ones of the possible system changes. As an example, the actual occurred system changes may include a first system change and a third system change and the possible system changes may include the first system change and a second system change. Since the actual occurred system changes do not include the second system change, the probability of the second system change is changed from 40% to 0%.

At 810, the effective system change module 310 normalizes the probability of the result of operation 808 and outputs an identified one or more effective system changes. The first system change in the above example is the resultant effective system change. The second system change and the third system change are not effective system changes. As an example, this normalization may be performed according to expression 1, where each system change k and the corresponding normalized probability $$\frac{Prob_k}{\sum_{i=1}^{m} Prob_i}$$

is provided.

$$\left(\text{system change } 1, \frac{Prob_1}{\sum_{i=1}^{m} Prob_i}; \ldots ; \text{system change } k, \frac{Prob_k}{\sum_{i=1}^{m} Prob_i}\right) \quad (1)$$

The resultant one or more effective system changes are outputted along with the corresponding probability distribution (e.g., first system change, 100%, system change 2, 0%, system change 3, 0%; . . . ). The sum of the probabilities of the probability distribution is 100%. The method may end at 812.

The above-described operations of FIGS. 5-8 are meant to be illustrative examples. The operations may be performed sequentially, synchronously, simultaneously, continuously, during overlapping time periods or in a different order depending upon the system application. Also, any of the operations may not be performed or skipped depending on the implementation and/or sequence of events.

The above-described methods may be implemented for various different system applications. The methods may be applied to various driving behavior system applications including braking, accelerating, steering, etc., as well as to various driving behavior parameters, such as environmental conditions including temperatures, pressures, flow rates, etc. The above-described methods may be used for driving behavior identification to: record driving behavior parameters (e.g., brake pedal position, accelerator pedal position, environmental conditions, etc.); record performance parameters (e.g., vehicle acceleration values, state of health of braking system, state of health of brake pad, etc.); monitor driving behavior and vehicle performance parameters and identify corresponding changes; and if there are changes in vehicle performance (e.g., indication of potential accelerated wear and tear) respond to correct any degraded performance. The vehicle performance changes may be attributed to changes in driving behavior. The change identification module 302 may monitor: driving behavior related parameters including brake pedal position, accelerator pedal position, and environment conditions; and performance related parameters including state of health of braking system and state of health of brake pads. The change identification module 302 may then provide corresponding system and performance change records. The performance-system change classifier module 308 may then provide system changes based on detected performance changes using artificial intelligence and/or machine learning. For example, the performance-system change classifier module 308 may receive an indication of a change in a state of health of one or more brake pads and based on this determine that a corresponding system change of brake pedal position associated with "hard" braking has occurred.

Figure 9:
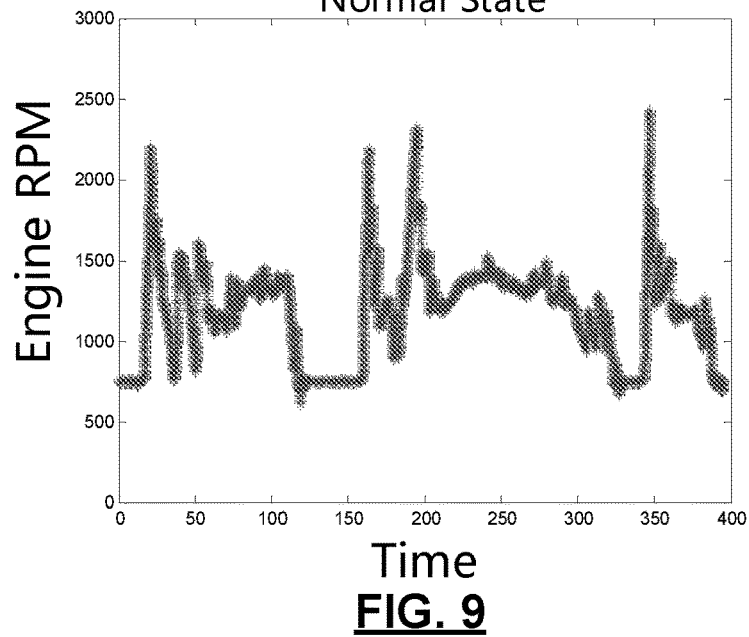
FIG. 9 is a sample plot of engine speed versus time for a normal state prior to a performance change.
Figure 10:
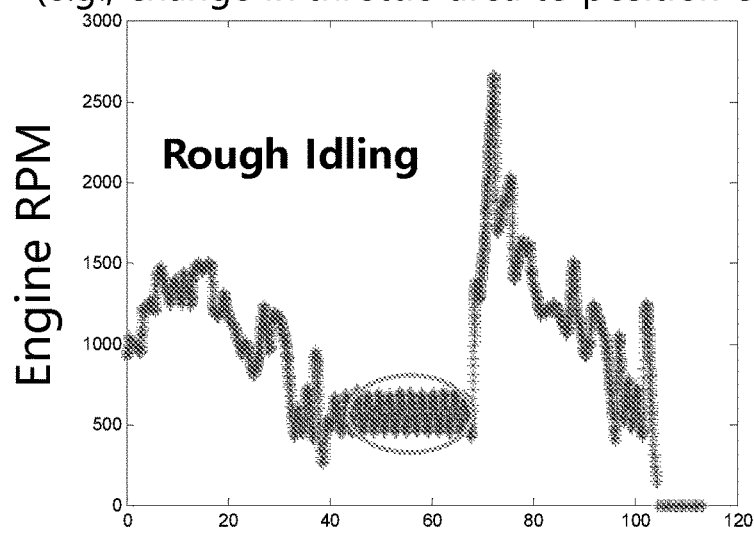
FIG. 10 is a sample plot of engine speed versus time illustrating a rough idling state subsequent to a performance change.

As another example, the above-described methods may be implemented for software change identification. The system parameters being monitored may include a software version, a calibration version, operating conditions, etc. The performance parameters and/or behaviors being monitored may include rough idling, engine speed, air flow rates and/or pressures, control parameters, diagnostic trouble codes, etc. The change identification module 302 may identify system and performance changes and record the changes over time. FIGS. 9-10 show examples of graphs of engine speed prior to a performance change and engine speed performance subsequent to the performance change. In the example shown, the performance change is from a normal idling condition to a rough idling condition.

During deployment at a software supplier and/or during a vehicle validation phase, variance in engine speed (or revolutions-per-minute (RPM)) at idle conditions to attribute the rough idling to a change in a throttle area to throttle position curve. In certain scenarios, system changes may result in triggering diagnostic trouble codes (DTCs). Similar change detection techniques may be created using machine learning and signal processing. The performance-system change classifier module 308 may receive an indication of a performance change (e.g., engine speed variation change to a high engine speed or engines speeds associated with rough idling). The performance-change classifier module 308 may then determine based on this indication a system change (e.g., change in throttle area due to change in throttle position, which may be related to position curve calibrations).

The above-described methods may also be applied to manufacturing process (e.g., a process for manufacturing a throttle body of a vehicle) change identification. The methods may be implemented to: record changes in operating conditions, operating times, and process changes (e.g., a change in a stage of a process having n stages, where n is an integer greater than or equal to 2); and record performance parameters (e.g., an opening response time, closing response time, default position, etc.). This parameter monitoring may be performed at various phases of vehicle life cycle, such as at a plant level phase, a pre-launch phase, and/or a fleet level phase. The change identification module monitors operating conditions in a plant (e.g., component or system) and identifies changes in a process of the plant and changes in component performance. If there are changes in component performance, the changes are correlated and attributed to changes in the system being monitored. The changes may be both manufacturing process changes and component and/or system operation changes.

During deployment at a manufacturing facility, an assembly facility, and/or a supplier, a manufacturing process may be implemented and system and performance changes may be monitored. The system changes may correspond to operating conditions (e.g., applied voltages, temperatures, etc.) and plant processes (e.g., location A versus location B, machine A versus machine B). The performance changes may correspond to component performance parameters. The change identification module 302 may identify the changes and provide system and performance change records. The performance-system change classifier module 308 may then, based on the system and performance change records, determine system changes based on the detected performance changes. The performance-system change classifier module 308 may determine a system change as a change in throttle position based on detection of a performance change for deviation in response time of the corresponding engine.

The above-described examples provide fast change detection and isolation to fix change-to-performance issues, aid in avoiding costs associated with manual expert efforts and wrong identified changes, and reduce warranty claims by identification of correct repairs. The examples are applicable to multiple system applications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" ay refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for identifying and responding to effective system changes in a monitored system comprising:
   a data collection module configured to track a plurality of parameters of the monitored system;
   a change identification module configured to, based on the plurality of parameters, identify (i) during training, a plurality of performance changes of a plurality of systems of a vehicle and a first plurality of system changes, and (ii) post training, a set of performance changes of the plurality of systems of the vehicle and a second plurality of system changes;
   a classifier construction module configured to, based on the plurality of performance changes and the first plurality of system changes construct a performance-system change classifier module, wherein the performance-system change classifier module is configured to, based on the set of performance changes, determine (i) possible effective and non-effective system changes for affecting and not affecting operating performance of the plurality of systems of the vehicle, and (ii) respective probability values, wherein the probability values are indicative respectively of probabilities that the second plurality of system changes for a first one or more of the plurality of systems affected one or more performance changes of a second one or more of the plurality of systems;

an effective system change module configured to, based on the second plurality of system changes and the possible effective and non-effective system changes, determine one or more effective system changes and a respective one or more probability values; and a parameter adjustment module configured to control an actuator of the monitored system based on the one or more effective system changes and the respective one or more probability values.

2. The control system of claim 1, wherein the data collection module is configured to determine which system related parameters and which performance related parameters to monitor that are relevant for identifying system changes and performance changes in operation of the monitored system.

3. The control system of claim 1, wherein the performance-system change classifier module is configured to identify associations between the set of performance changes and the possible system changes using data analytics and signal processing.

4. The control system of claim 1, wherein the classifier construction module is configured to:
represent system change and performance change relationships as a cause-effect model; and
based on the cause-effect model, construct the performance-system change classifier module using at least one of artificial intelligence or machine learning.

5. The control system of claim 1, wherein the performance-system change classifier module implements at least one of a support vector machine or a random forest algorithm to determine the possible effective and non-effective system changes based on the set of performance changes.

6. The control system of claim 1, wherein the performance-system change classifier module is configured to determine the possible effective system changes and respective probabilities based on (i) an individualized classifier model for classifying performance changes of the plurality of systems individually, and (ii) an aggregated classifier model for classifying performance changes of the plurality of systems in aggregate.

7. The control system of claim 1, wherein the change identification module is configured to:
discretize data collected for at least one of the plurality of parameters including comparing the data to predetermined ranges and converting each data point to one of a predetermined set of finite values; and
detect the set of performance changes based on changes in values of the converted data.

8. The control system of claim 1, wherein the classifier construction module is configured to:
arrange the first plurality of system changes and the plurality of performance changes according to respective times of occurrence;
re-organize the arranged first plurality of system changes and plurality of performance changes into multiple tuples; and
construct the performance-system change classifier module based on the tuples.

9. The control system of claim 1, wherein the effective system change module is configured to:
determine which ones of the one or more effective system changes are not included in the second plurality of system changes and set the corresponding probabilities to 0%; and
normalize at least probabilities of remaining ones of the one or more effective system changes having probabilities greater than 0% to determine the one or more effective system changes and a corresponding probability distribution.

10. The control system of claim 1, further comprising the actuator, wherein:
the actuator is implemented in a vehicle; and
the parameter adjustment module is configured to,
based on the one or more effective system changes and the respective one or more probability values, at least one of adjust a calibration setting or evaluate a diagnostic fault of the monitored system, and
based on the adjusted calibration setting or a result of the evaluation of the diagnostic fault, adjust operation of the actuator.

11. The control system of claim 1, wherein:
the one or more effective system changes are system application dependent and are system changes that cause performance changes to one or more of the plurality of systems; and
the plurality of systems include two or more of a propulsion system, a heating ventilation and air-conditioning system, a steering system, a brake system, a lighting system, a window and door system, and a seating system.

12. The control system of claim 1, wherein the probability values determined by the classifier construction module are indicative respectively of probabilities that the possible effective system changes caused the set of performance changes.

13. The control system of claim 1, wherein the effective system change module is configured to (i) based on the possible effective and non-effective system changes, determine which of the second plurality of system changes are effective system changes, and (ii) for the second plurality of system changes that are effective system changes determine corresponding probability values.

14. A method of identifying and responding to effective system changes in a monitored system, the method comprising:
tracking a plurality of parameters of the monitored system;
based on the plurality of parameters, identifying (i) during training, a plurality of performance changes of a plurality of systems of a vehicle and a first plurality of system changes, and (ii) post training, a set of performance changes of the plurality of systems of the vehicle and a second plurality of system changes;
based on the plurality of performance changes and the first plurality of system changes constructing a performance-system change classifier module, wherein the performance-system change classifier module is configured to, based on the set of performance changes, determine (i) possible effective and non-effective system changes for affecting and not affecting operating performance of the plurality of systems of the vehicle, and (ii) respective probability values, wherein the probability values are indicative respectively of probabilities that the second plurality of system changes for a first one or more of the plurality of systems affected one or more performance changes of a second one or more of the plurality of systems;

based on the second plurality of system changes and the possible effective and non-effective system changes, determining one or more effective system changes and a respective one or more probability values; and based on the one or more effective system changes and the respective one or more probability values, controlling an actuator of the monitored system based on the one or more effective system changes and the respective one or more probability values.

15. The method of claim 14, further comprising:

representing system change and performance change relationships as a cause-effect model; and based on the cause-effect model, constructing the performance-system change classifier module using at least one of artificial intelligence or machine learning.

16. The method of claim 14, further comprising implementing at least one of a support vector machine or a random forest algorithm to determine the possible effective and non-effective system changes based on the set of performance changes.

17. The method of claim 14, further comprising determining the possible effective system changes and respective probabilities based on (i) an individualized classifier model for classifying performance changes of the plurality of systems individually, and (ii) an aggregated classifier model for classifying performance changes of the plurality of systems in aggregate.

18. The method of claim 14, further comprising:

arranging the first plurality of system changes and the plurality of performance changes according to respective times of occurrence;

re-organizing the arranged first plurality of system changes and plurality of performance changes into multiple tuples; and constructing the performance-system change classifier module based on the tuples.

19. The method of claim 14, further comprising:

determining which ones of the one or more effective system changes are not included in the second plurality of system changes and set the corresponding probabilities to 0%; and normalizing at least probabilities of remaining ones of the one or more effective system changes having probabilities greater than 0% to determine the one or more effective system changes and a corresponding probability distribution.

20. The method of claim 14, further comprising:

based on the one or more effective system changes and the respective one or more probability values, at least one of adjusting a calibration setting or evaluating a diagnostic fault of the monitored system; and based on the adjusted calibration setting or a result of the evaluating of the diagnostic fault, adjusting operation of the actuator, wherein the actuator is implemented in a vehicle.

* * * * *